(12) United States Patent
Takehara et al.

(10) Patent No.: US 7,371,015 B2
(45) Date of Patent: May 13, 2008

(54) CONNECTOR FOR TWO-WAY OPTICAL COMMUNICATIONS

(75) Inventors: Naoya Takehara, Osaka (JP); Hiroshi Nakagawa, Osaka (JP); Takeshi Isoda, Yao (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 11/639,779

(22) Filed: Dec. 15, 2006

(65) Prior Publication Data

US 2007/0140629 A1  Jun. 21, 2007

(30) Foreign Application Priority Data

Dec. 21, 2005  (JP)  ............... 2005-367844

(51) Int. Cl.
*G02B 6/36* (2006.01)
(52) U.S. Cl. ............... 385/89; 385/55; 385/56; 385/60; 385/61; 385/64; 385/66; 385/72; 385/73; 385/90
(58) Field of Classification Search ............ 385/55–56, 385/60–61, 64, 66, 72–74, 89–90, 92
See application file for complete search history.

(56) References Cited

U.S. PATENT DOCUMENTS 6,491,443 B1 * 12/2002 Serizawa et al. ............. 385/61
6,499,889 B1 * 12/2002 Shirakawa et al. ........... 385/88

FOREIGN PATENT DOCUMENTS

| EP | 1 170 609 | 1/2002 |
|---|---|---|
| EP | 1 170 612 | 1/2002 |
| EP | 1 635 205 | 3/2006 |
| EP | 1 659 432 | 5/2006 |
| JP | 2001-133665 | 5/2001 |
| JP | 2006-154788 | 6/2006 |

OTHER PUBLICATIONS

First Office Action issued on Dec. 28, 2007 for corresponding Chinese Patent Application No. 200610171230.X with its full English translation.

* cited by examiner

*Primary Examiner*—Frank G. Font
*Assistant Examiner*—Hung Lam
(74) *Attorney, Agent, or Firm*—David N. Lathrop, Esq.; Gallagher & Lathrop

(57) ABSTRACT

Attachments are respectively attached to one ends of a pair of light guides, which are integrally formed via a connecting portion, such that the attachments surround the one ends of the light guides. The one ends protrude from a rear face of a receptacle body and are opposed to a light-emitting device and a light-receiving device, respectively. The attachments are inserted and positioned in guide holes formed respectively on the light-emitting device and the light-receiving device, and the optical axes of the pair of light guides and the optical axes of the light-emitting device and the light-receiving device are aligned with each other.

6 Claims, 13 Drawing Sheets

FIG. 10A
FIG. 10B
FIG. 10C
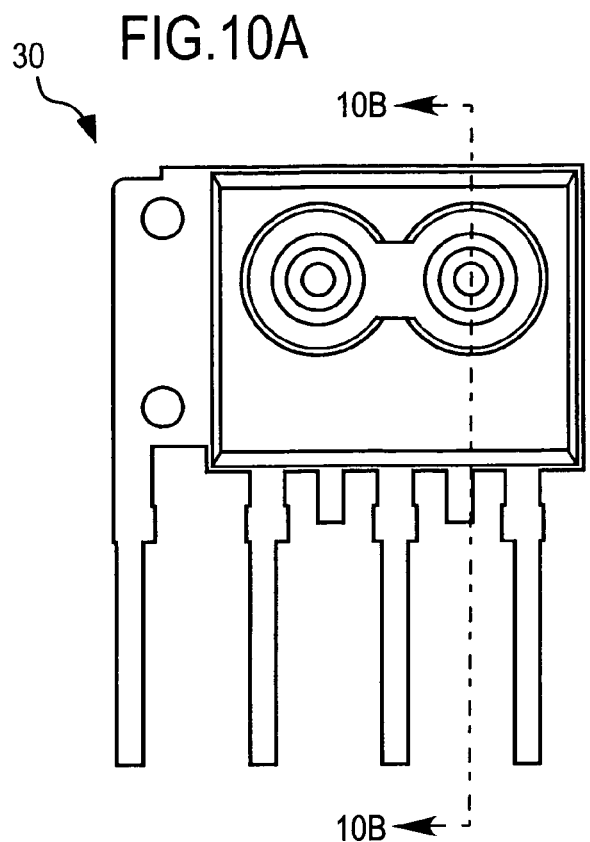
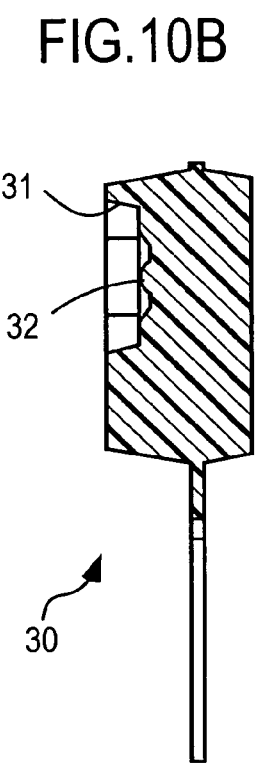
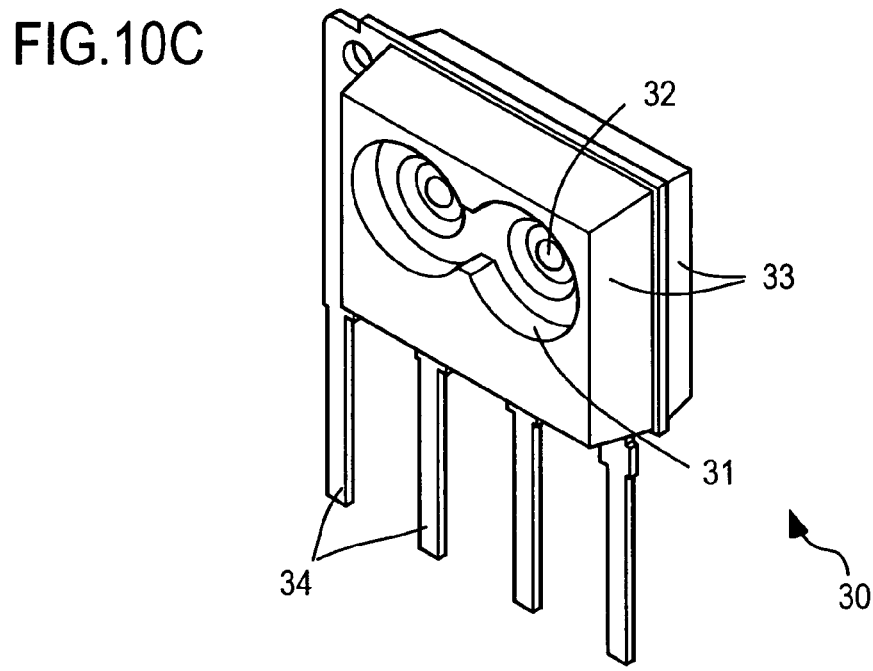

CONNECTOR FOR TWO-WAY OPTICAL COMMUNICATIONS

BACKGROUND OF THE INVENTION

1. Field of the Invention

The present invention relates to a connector for two-way optical communications, the connector being connected to an optical plug holding a transmitting optical fiber and a receiving optical fiber.

2. Description of the Related Art

This kind of connector generally includes a light-emitting device, a light-receiving device, and light guides (light guiding members) for optically connecting the light-emitting device and the light-receiving device to the transmitting optical fiber and the receiving optical fiber of the opposite optical plug. For example, Patent document 1 (Japanese Patent Application Laid-Open No. 2001-133665) describes a connector configure thus.

In the connector of Patent document 1, a pair of receiving tubes is formed in a connector housing. The optical fibers (ferrules are placed on the ends of the fibers) of an optical plug are inserted in the receiving tubes. Light guides (referred to as sleeves in Patent document 1) are press-fitted into the receiving tubes and fixed at the back sides of the receiving tubes. However, in the fixation structure of such light guides, a stress caused by the press-fit may act on the light guides and the optical property (optical function) of the light guides may be deteriorated by the influence of the stress.

In order to avoid such a problem, the present applicant has already proposed, in Japanese Patent Application Laid-Open No. 2006-154788 (not publicly known on the priority date), light guides (light guide unit) and a connector using the same in which a pair of transmitting and receiving light guides is combined into a single unit via a connecting portion and the connecting portion is fixed by press fitting, so that a stress caused by the press-fit does not act on the light guides, that is, the optical property of the light guides is not deteriorated by the influence of the stress. Further, the coupling area of the connecting portion and the light guides is minimized to reduce a transmission loss caused by light leaking to the connecting portion integrally formed of the same material as the light guides and reduce cross talk occurring when transmitted light is incident on a light-receiving device of a local station, and components causing leakage of light are eliminated as much as possible.

FIGS. 1 to 5 show the configuration proposed in Japanese Patent Application Laid-Open No. 2006-154788. FIG. 1 shows the cross-sectional configuration of the connector. FIGS. 2 and 3 show the configuration of the light guide unit (referred to as an optical coupling member in Japanese Patent Application Laid-Open No. 2006-154788) and the configuration of a receptacle body, respectively. FIG. 4 shows the detail of the configuration of the attached light guide unit. FIG. 1 also shows optical fibers held by the ferrules of the opposite optical plug. In other words, FIG. 1 shows the optical fibers and ferrules in a state in which the optical plug is mated and connected. The illustration of optical fiber cores and a clad is omitted (the same in the following description).

The connector includes, as shown in FIG. 1, a receptacle body 10 made of resin, a light guide unit 20, a light-emitting device 30, a light-receiving device 40, a device holder 50, and a shield cover 60. In FIG. 1, reference numerals 71 and 72 denote a transmitting optical fiber and a receiving optical fiber of an optical plug, and reference numerals 73 and 74 denote ferrules respectively placed on the ends of the optical fibers.

In the light guide unit 20 of this example, as shown in FIG. 2, a pair of light guides 21 and 22 shaped like cylinders is combined into a single unit via a connecting portion 23. Further, the light guide unit 20 of this example is integrally formed by resin molding. Collimate lenses 21a and 21b and collimate lenses 22a and 22b are respectively formed on both end faces of the light guides 21 and 22. The illustration of the cores of the light guides 21 and 22 and a clad is omitted (the same in the following description).

The connecting portion 23 is configured as a plate and includes a base portion 24 and a pair of connecting ends 25 and 26 protruded from the base portion 24 in opposite directions along the plate surface. The connecting ends 25 and 26 are respectively connected to the sides (circumferential surfaces) of the axially intermediate portions of the light guides 21 and 22. Areas where the connecting ends 25 and 26 are connected to the circumferential surfaces of the light guides 21 and 22 are not larger than areas halfway around the light guides 21 and 22. Further, a large notch 27 shaped like a letter V is formed on the base portion 24.

As shown in FIG. 1, a recessed portion 11 is formed on the receptacle body 10. The opposite optical plug is inserted to the front of the recessed portion 11, and a pair of receiving tubes 12 is formed in the recessed portion 11. The pair of receiving tubes 12 is formed so as to protrude from a rear wall 13 of the receptacle body 10 making up the bottom surface of the recessed portion 11. The receiving tubes 12 include holes 12a, to which the ferrules 73 and 74 are inserted and fit, and through holes 14 continuing from the holes 12a. The through holes 14 connecting with the receiving tubes 12 are caused to penetrate the rear wall 13 and opened on a rear face (the outer side of the rear wall 13) 13a of the receptacle body 10.

As shown in FIG. 3, a recessed portion 15 corresponding to the outside shape of the connecting portion 23 of the light guide unit 20 is formed on the rear face 13a of the receptacle body 10. Further, guides 16 are formed outside the pair of through holes 14 so as to protrude halfway around the through holes 14. The inner circumferential surface of the guide 16 shaped like a semicylinder and the inner circumferential surface of the through hole 14 are flush with each other. As shown in FIG. 4, six protrusions 17 are formed on side wall surfaces formed along the depth direction in the recessed portion 15. The protrusions 17 are formed on positions at the same distances from the rear face 13a in the depth direction of the recessed portion 15, and the protrusions 17 are hemispherical in cross section.

The light guide unit 20 is attached to the receptacle body 10 by inserting the light guides 21 and 22 into the pair of through holes 14 from the rear face 13a of the receptacle body 10 and press-fitting the connecting portion 23 into the recessed portion 15. Thus, as shown in FIG. 4, the protrusions 17 are pressed and brought into contact with the connecting portion 23, so that the connecting portion 23 is positioned and fixed. At this point, the ends of the light guides 21 and 22 protrude on the side of the rear face 13a of the receptacle body 10, and a half of the circumference of each of the ends of the light guides 21 and 22 is held by the guide 16.

As shown in FIG. 1, the light-emitting device 30 and the light-receiving device 40 are stored and held in the device holder 50. In this example, the device holder 50 is stored and held in the shield cover 60. The shield cover 60 is attached to the receptacle body 10 from the rear face 13a, so that the light-emitting device 30 and the light-receiving device 40 are opposed to the end faces of the light guides 21 and 22, respectively. At this point, the pair of guides 16 formed so as to protrude on the rear face 13a of the receptacle body 10 is engaged and positioned in guide holes 31 and 41 formed on the light-emitting device 30 and the light-receiving device 40, respectively. Thus the optical axes of the light guides 21 and 22 and the optical axes of the light-emitting device 30 and the light-receiving device 40 are aligned with each other.

The transmitting optical fiber 71 and the receiving optical fiber 72 of the opposite optical plug are optically connected to the light-emitting device 30 and the light-receiving device 40 via the light guides 21 and 22, respectively. The transmitting optical fiber 71 and the receiving optical fiber 72 are held by the ferrules 73 and 74 and inserted into the receiving tubes 12.

In the connector configured thus, the light guide unit 20 is attached to the receptacle body 10 by press-fitting and fixing the connecting portion 23 into the recessed portion 15 of the receptacle body 10. Thus a stress caused by the press fitting does not act on the light guides 21 and 22, so that the optical property of the light guides 21 and 22 is not deteriorated by the stress.

Further, only the connecting ends 25 and 26 of the connecting portion 23 are connected to the light guides 21 and 22 and thus the coupling area of the connecting portion 23 and the light guides 21 and 22 is reduced. Thus leakage of light from the light guides 21 and 22 to the connecting portion 23 is suppressed. It is therefore possible to achieve a connector having high light transmission efficiency and less cross talk.

Incidentally, in the connector of FIGS. 1 to 5, the pair of guides 16 is formed so as to protrude on the rear face 13a of the receptacle body 10 and the guides 16 are engaged in guide holes 31 and 41 formed on the light-emitting device 30 and the light-receiving device 40, respectively. Thus the optical axes of the light guides 21 and 22 and the optical axes of the light-emitting device 30 and the light-receiving device 40 are aligned with each other (alignment). In this case, the connecting portion 23 is present between the light guides 21 and 22, and the light guides 21 and 22 are inserted into the through holes 14 from the rear face 13a of the receptacle body 10. For this reason, the guides 16 cannot be cylindrical. The guides 16 are, as described above, shaped like semicylinders to avoid the connecting portion 23.

Therefore, the guides 16 configured thus cannot hold the entire circumferences of the light guides 21 and 22. Thus, for example, in the event of molding strain on the receptacle body 10 and the light guide unit 20, misalignment may occur between the light guides 21 and 22 and the light-emitting device 30 and the light-receiving device 40.

FIG. 5A shows this state. FIG. 5A shows an example in which molding strain occurs on the receptacle body 10 and FIG. 5B shows an example in which molding strain occurs on the light guide unit 20. FIGS. 5A and 5B are both exaggerated for purposes of illustration. In FIGS. 5A and 5B, reference numerals 32 and 42 denote lenses formed on the light-emitting device 30 and the light-receiving device 40, respectively.

As shown in FIGS. 5A and 5B, when molding strain occurs on the receptacle body 10 or the light guide unit 20, the centers of the guides 16 formed into semicylinders in the receptacle body 10 and the centers of the light guides 21 and 22 are displaced from each other. On the other hand, the guides 16 are engaged in the guide holes 31 and 41 formed on the light-emitting device 30 and the light-receiving device 40, respectively. Thus the lenses 32 and 42 of the light-emitting device 30 and the light-receiving device 40 are respectively placed on the centers of the guides 16. Hence, when molding strain occurs on the receptacle body 10 or the light guide unit 20, the lenses 32 and 42 of the light-emitting device 30 and the light-receiving device 40 and the centers of the light guides 21 and 22 are displaced from each other as shown in FIGS. 5A and 5B, resulting in misalignment between the light guides 21 and 22 and the light-emitting device 30 and the light-receiving device 40.

Such misalignment causes a large loss of optical coupling between the light guides 21 and 22 and the light-emitting device 30 and the light-receiving device 40 and seriously deteriorates the optical property of the connector.

SUMMARY OF THE INVENTION

In view of this problem, the present invention has as its object the provision of a connector for two-way optical communications, the connector enabling reliable alignment (optical axis alignment) between light guides and a light-emitting device and a light-receiving device and achieving a stable and excellent optical property.

The connector for two-way optical communications of the present invention comprises a receptacle body including a pair of receiving tubes to which a transmitting optical fiber and a receiving optical fiber are respectively inserted, the receiving tubes being formed in a recessed portion provided on the front face of the receptacle body, the receptacle body including a pair of through holes that are respectively connected with the receiving tubes and opened on the rear face of the receptacle body, a device holder for holding a light-emitting device and a light-receiving device, the device holder being attached to the rear face, and a light guide unit including a pair of light guides shaped like cylinders and a connecting portion integrally interposed between the light guides, the light guides being respectively inserted in the pair of through holes, the light guides having one ends protruding from the rear face, the one ends being respectively opposed to the light-emitting device and the light-receiving device, the light guide unit optically connecting the transmitting optical fiber and the receiving optical fiber respectively to the light-emitting device and the light-receiving device, the connector further comprising attachments that surround the one ends of the pair of light guides protruding from the rear face and hold the one ends, wherein the attachments are inserted and positioned in guide holes respectively formed on the light-emitting device and the light-receiving device, so that the optical axes of the pair of light guides and the optical axes of the light-emitting device and the light-receiving device are aligned with each other.

In the present invention, it is preferable that the light-emitting device and the light-receiving device are slidably held by the device holder such that the guide holes are respectively engaged with the attachments.

In the present invention, it is preferable that the through holes are increased in diameter on the side of the rear face and the one ends of the light guides are made bendable such that the attachments are engaged with the guide holes.

In the present invention, it is preferable that the two attachments are integrally formed via a flexible coupling portion.

According to the present invention, the attachments are attached on the one ends of the light guides, the one ends being opposed to the light-emitting device and the light-receiving device, the entire circumferences of the light guides are held by the attachments, and the attachments are respectively inserted and positioned in the guide holes of the light-emitting device and the light-receiving device, so that the optical axes of the pair of light guides and the optical axes of the light-emitting device and the light-receiving device are aligned with each other. Thus even in the event of molding strain on the receptacle body or the light guides (light guide unit), misalignment in the prior art does not occur.

It is therefore possible to obtain a connector for two-way optical communications with a low optical coupling loss and a stable and excellent optical property.

BRIEF DESCRIPTION OF THE DRAWINGS

FIG. 10A is a front view showing the shape of a light-emitting device of FIG. 7;

FIG. 10B is a sectional view showing the shape of the light-emitting device of FIG. 7;

FIG. 10C is a perspective view showing the shape of the light-emitting device of FIG. 7;

DETAILED DESCRIPTION OF THE PREFERRED EMBODIMENT

Figure 1:
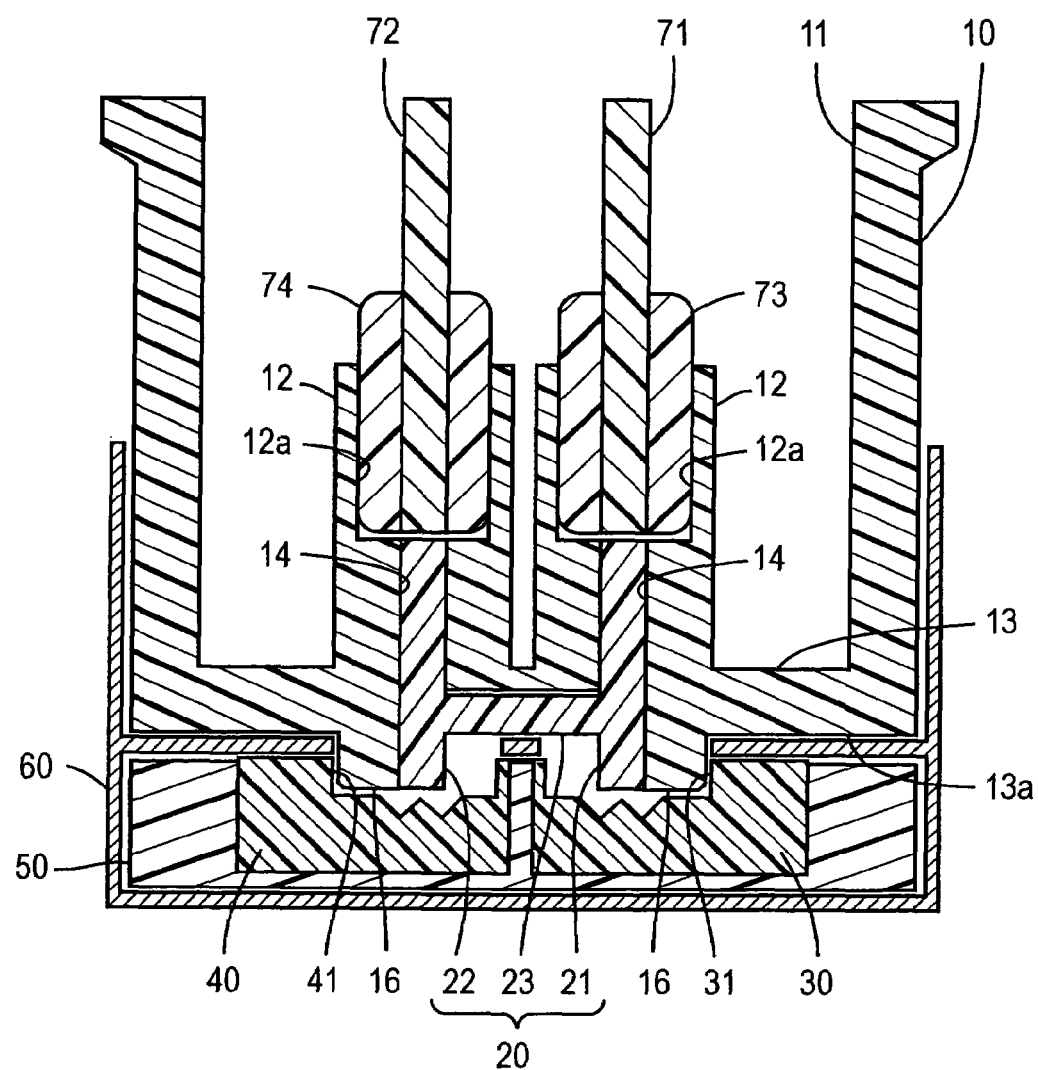
FIG. 1 is a sectional view showing the configuration of a prior art not publicly known on the priority date of a connector for two-way optical communications.
Figure 2A:
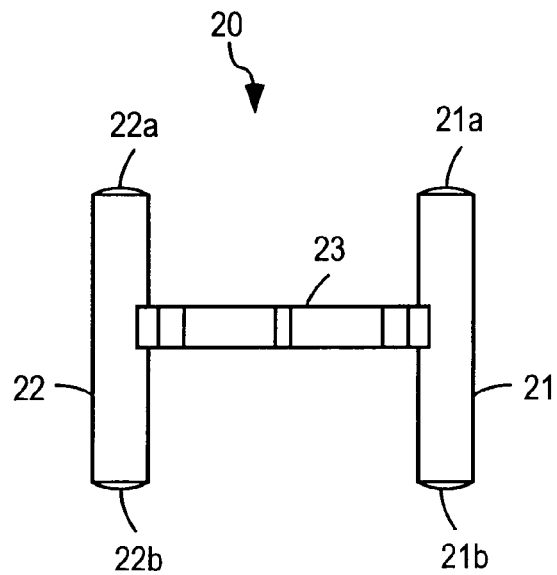
FIG. 2A is a plan view showing the shape of a light guide unit of FIG. 1.
Figure 2D:
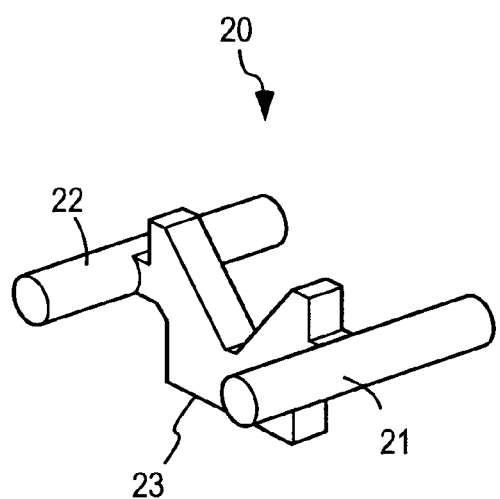
FIG. 2D is a perspective view showing the shape of the light guide unit of FIG. 1.
Figure 2B:
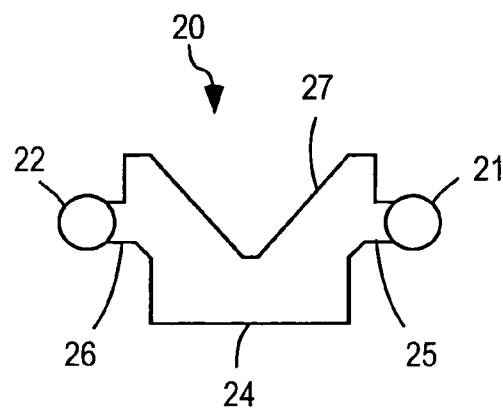
FIG. 2B is a front view showing the shape of the light guide unit of FIG. 1.
Figure 2C:
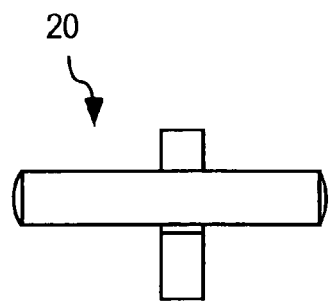
FIG. 2C is a side view showing the shape of the light guide unit of FIG. 1.

A preferred embodiment of the present invention will now be described below.

The embodiment of the present invention will be described based on examples with reference to the accompanying drawings. Parts corresponding to those of FIGS. 1 to 5 are indicated by the same reference numerals and the detailed explanation thereof is omitted.

Figure 6A:
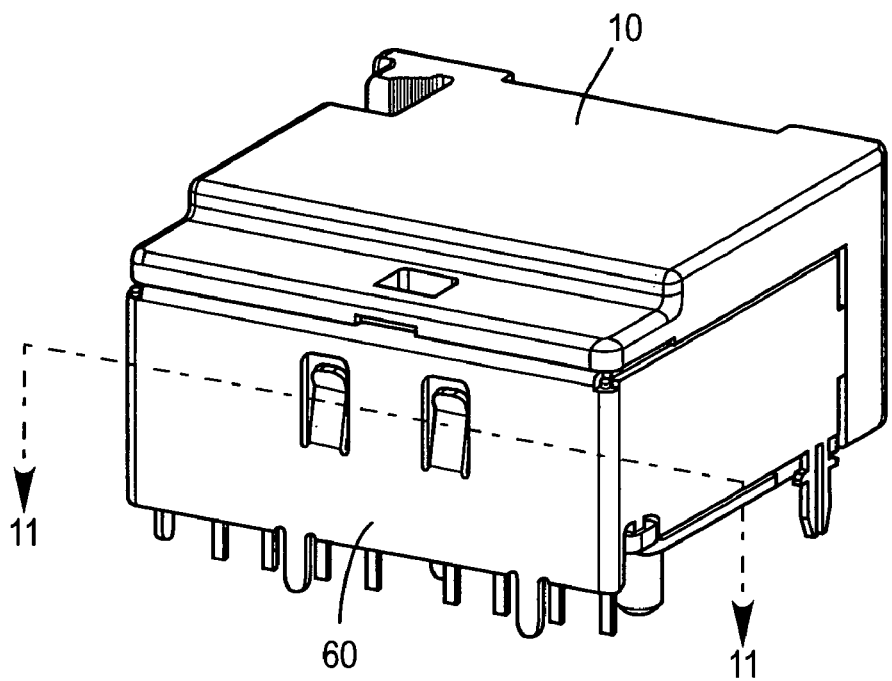
FIG. 6A is a perspective view showing the rear side of the appearance of an embodiment of the connector for two-way optical communications of the present invention.
Figure 6B:
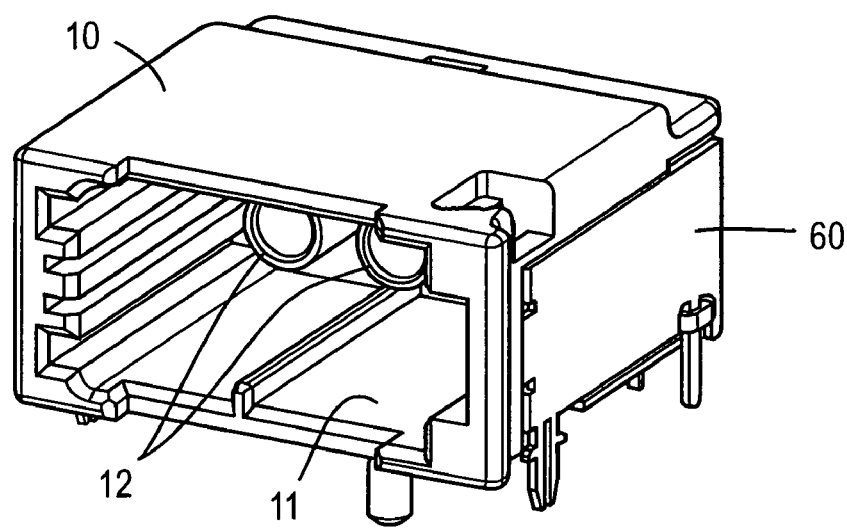
FIG. 6B is a perspective view showing the front of the appearance of the embodiment of the connector for two-way optical communications of the present invention.
Figure 7:
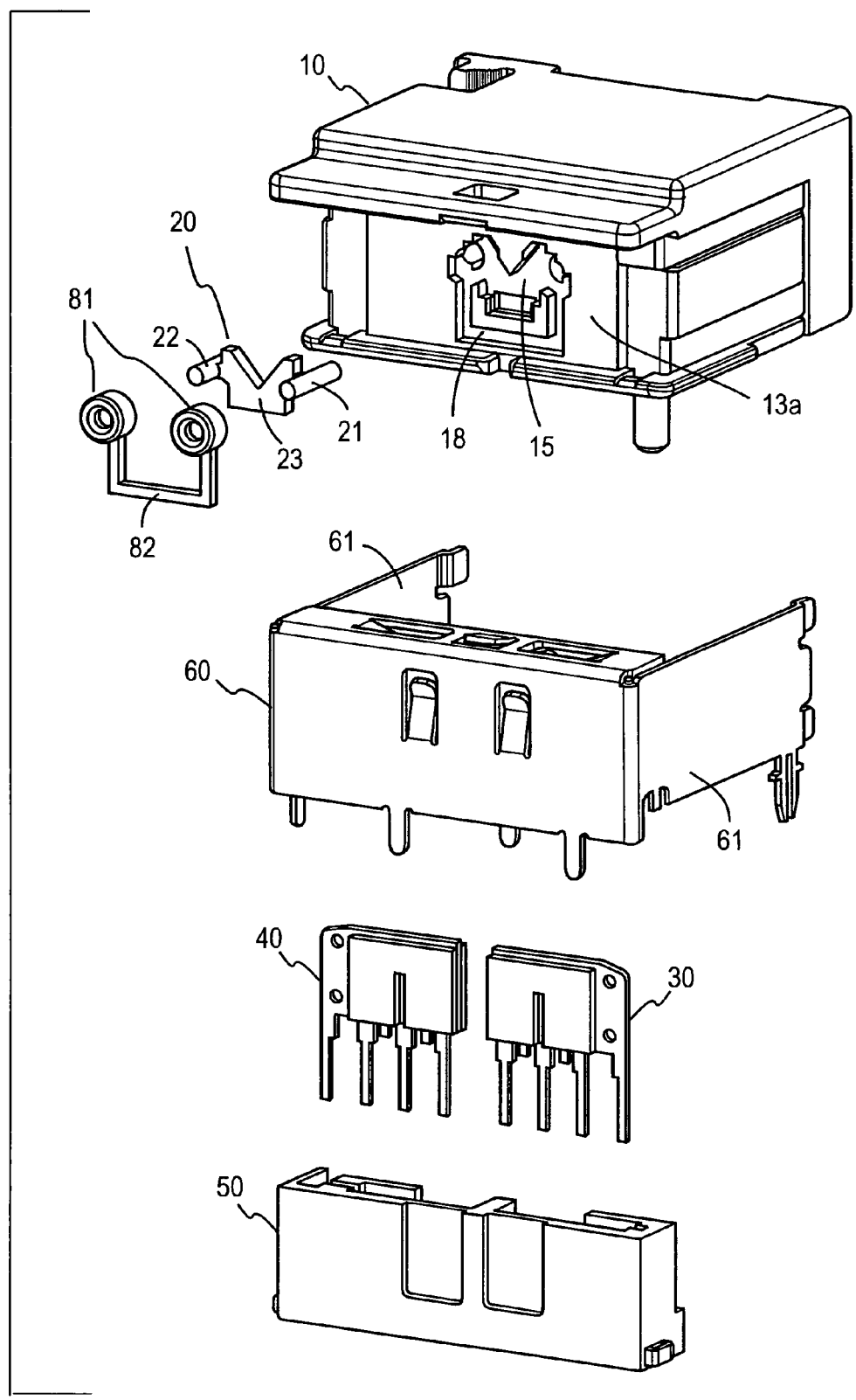
FIG. 7 is an exploded perspective view (rear view) of the connector for two-way optical communications of FIG. 6.
Figure 8:
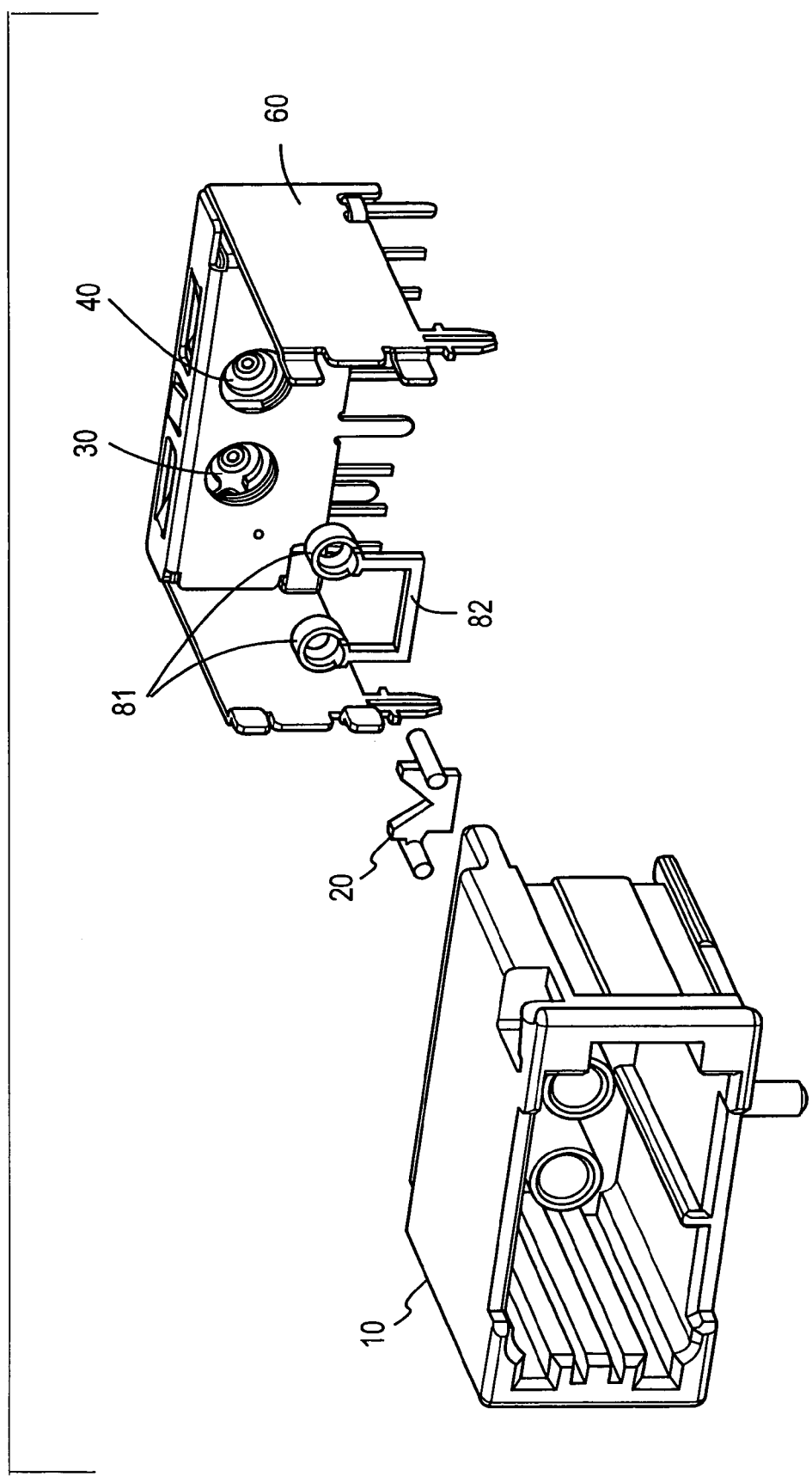
FIG. 8 is a perspective view (front view) of the partially disassembled connector for two-way optical communications of FIG. 6.

FIG. 6 shows the appearance of a connector for two-way optical communications of the present invention. FIG. 7 shows a state in which the connector is disassembled into parts. FIG. 8 shows the partially disassembled connector which is viewed from the front of the connector, that is, in the opposite direction from FIG. 7.

In this example, as shown in FIG. 7, the connector comprises a receptacle body 10, a light guide unit 20, a light-emitting device 30, a light-receiving device 40, a device holder 50, and a shield cover 60 as in the connector of FIGS. 1 to 5. Further, the connector comprises two attachments 81. The two attachments 81 are integrally formed via a coupling portion 82 in this example. The attachments 81 are attached to light guides 21 and 22. Referring to FIG. 9, the configuration of the attachments 81 and the coupling portion 82 will be first described below.

Figure 9A:
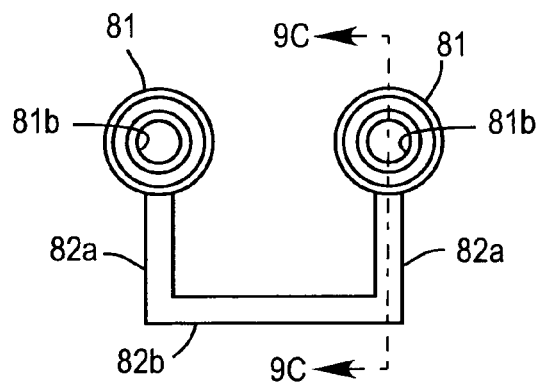
FIG. 9A is a front view showing the shape of two connected attachments of FIG. 7.
Figure 9B:
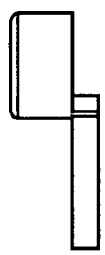
FIG. 9B is a side view showing the shape of the two connected attachments of FIG. 7.
Figure 9C:
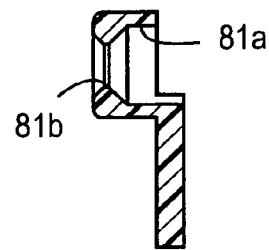
FIG. 9C is a sectional view showing the shape of the two connected attachments of FIG. 7.
Figure 9D:
FIG. 9D is a bottom view showing the shape of the two connected attachments of FIG. 7.
Figure 9E:
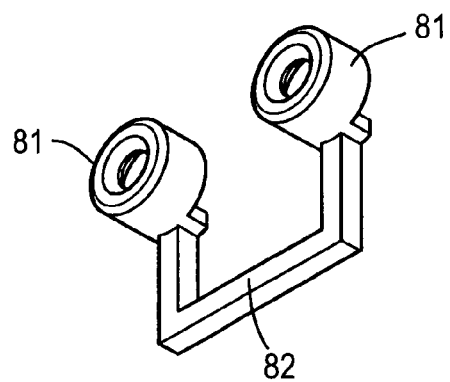
FIG. 9E is a perspective view showing the shape of the two connected attachments of FIG. 7.

The attachments 81 are shaped like cylinders and through holes 81a are respectively formed at the centers of the attachments 81 (FIG. 9C). As shown in FIG. 9C, a holding portion 81b having a small diameter is formed on one end of the through hole 81a. Both sides between which the holding portion 81b is interposed are tapered and increased in diameter toward the outside.

In this example, the coupling portion 82 connecting the two attachments 81 is extended into a U-shape. The coupling portion 82 includes a pair of legs 82a and an intermediate portion 82b connecting the legs 82a, and the paired legs 82a are respectively connected to the attachments 81.

The pair of attachments 81 and the coupling portion 82 that are configured thus are integrally formed by, for example, injection molding. Further, the coupling portion 82 is sufficiently reduced in cross section and formed into a U-shape with an angle, so that the coupling portion 82 is sufficiently flexible.

FIG. 10 shows the configuration of the light-emitting device 30. For example, the light-emitting device 30 is configured such that a laser diode (LD) is sealed with resin and terminals are drawn out from the sealing resin. In FIG. 10, reference numeral 33 denotes the sealing resin and reference numeral 34 denotes the terminals. A guide hole 31 is formed on the sealing resin 33 and a lens 32 shaped like a hemisphere is formed at the center of a surface lower than the underside of the guide hole 31. The laser diode (not shown) is placed in the rear (below) of the lens 32 such that the optical axis of the laser diode is aligned with that of the lens 32. Moreover, the guide hole 31 has a tapered inner side surface and is increased in diameter toward the surface.

On the other hand, the light-receiving device 40 is, for example, configured such that a photodiode (PD) is sealed with resin and terminals are drawn out from the sealing resin as in the light-emitting device 30. In this example, the light-receiving device 40 has an outside shape that is symmetrical (line symmetry) to the light-emitting device 30 as shown in FIG. 7. A guide hole 41 provided on the light-receiving device 40 has a tapered inner side surface as in the guide hole 31 of the light-emitting device 30.

Figure 3A:
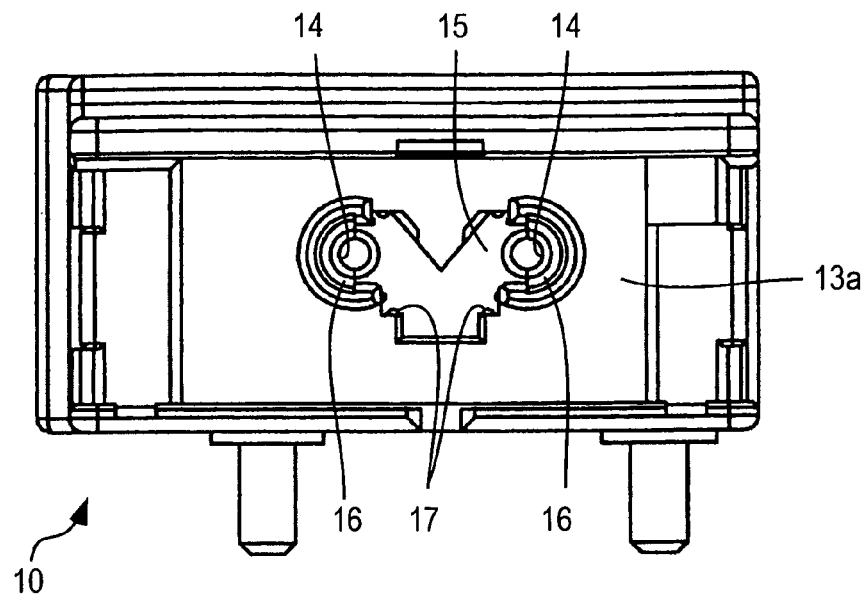
FIG. 3A is a rear view showing the shape of a receptacle body of FIG. 1.
Figure 3B:
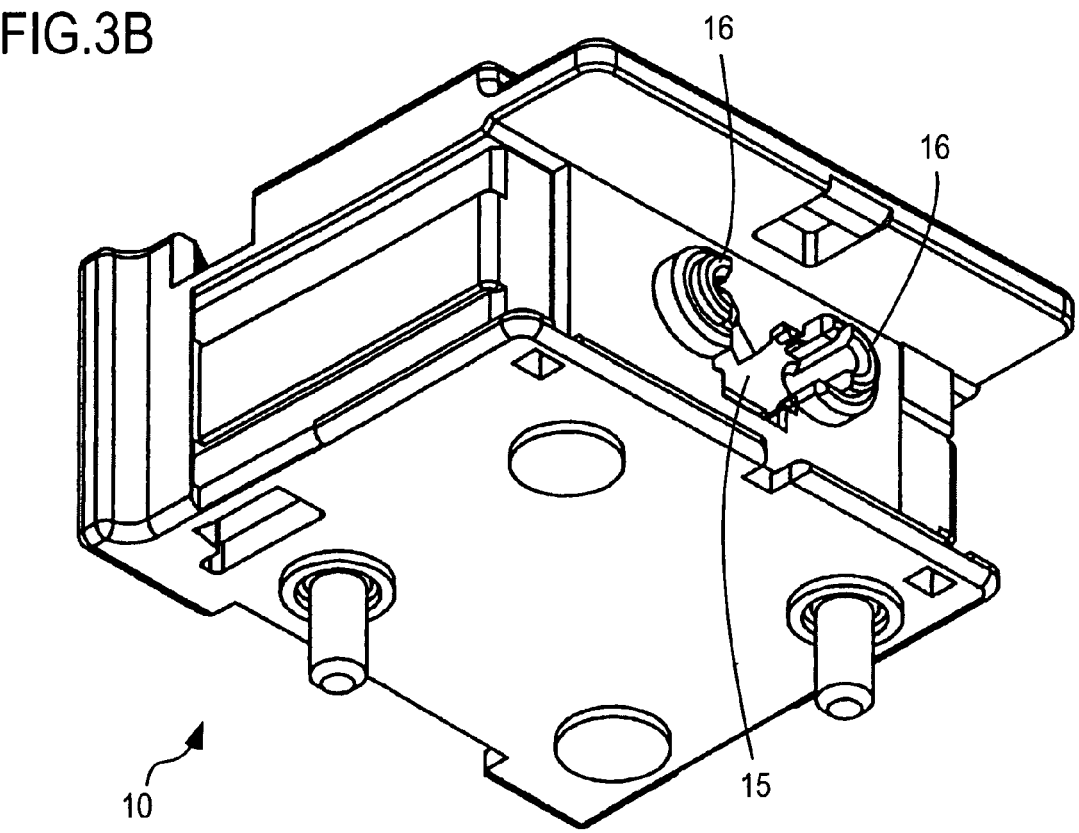
FIG. 3B is a perspective view showing the shape of the receptacle body of FIG. 1.
Figure 4:
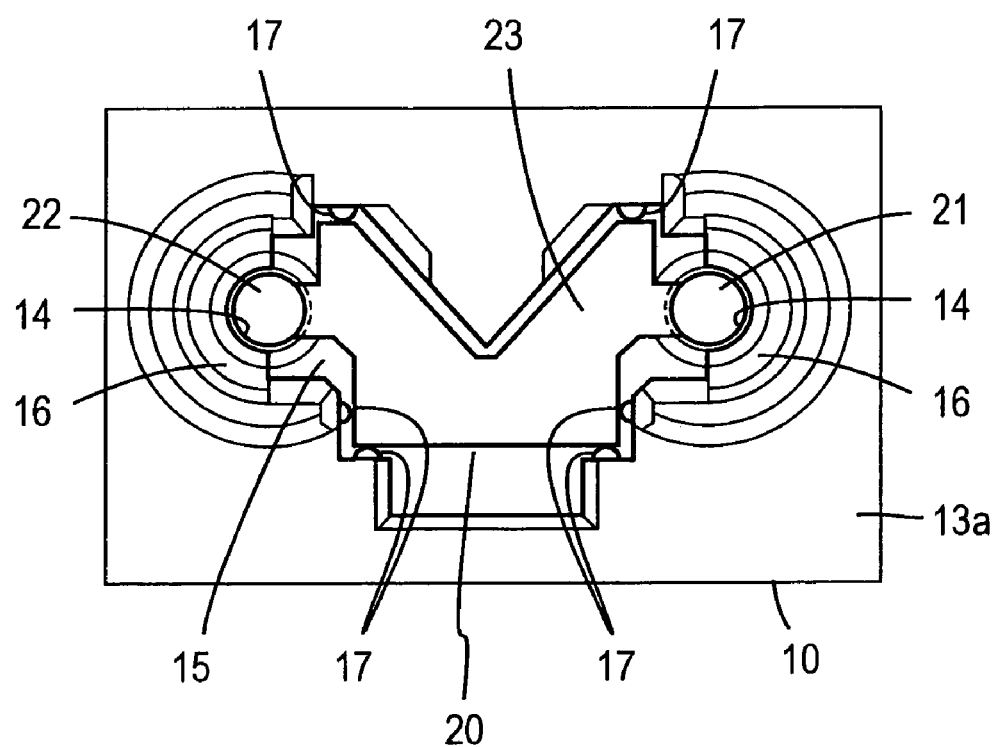
FIG. 4 shows a state in which the light guide unit is mounted in the receptacle body in a connector for two-way optical communications of FIG. 1.

In this example, in addition to a recessed portion 15 corresponding to the outside shape of the connecting portion 23 of the light guide unit 20, a recessed portion 18 corresponding to the outside shape of the coupling portion 82 for connecting the two attachments 81 is formed on a rear face 13*a* of the receptacle body 10 as shown in FIG. 7. Further, a pair of guides 16 protruding on the rear face 13*a* as shown in FIG. 3 is not provided in this example.

The assembly of the parts will be described below.

Figure 11:
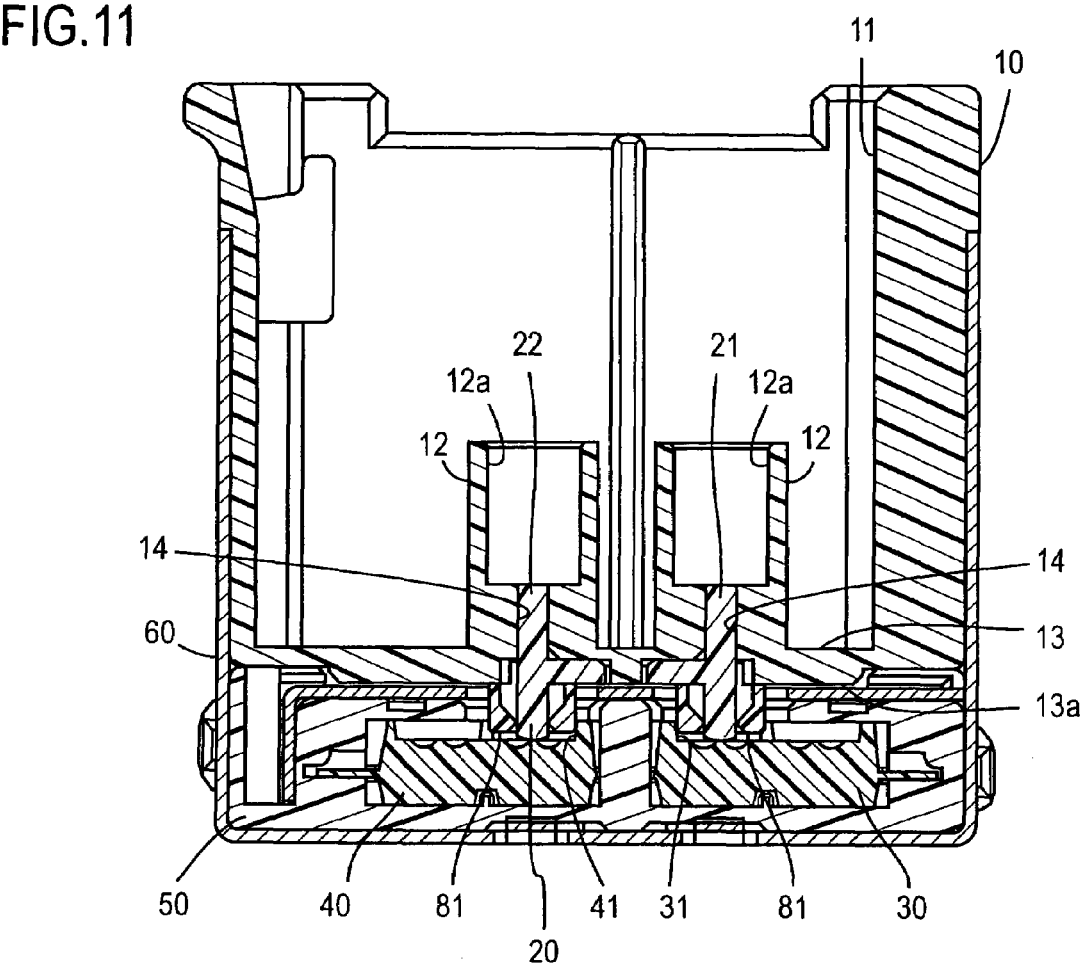
FIG. 11 is a sectional view of the connector for two-way optical communications of FIG. 6.
Figure 12:
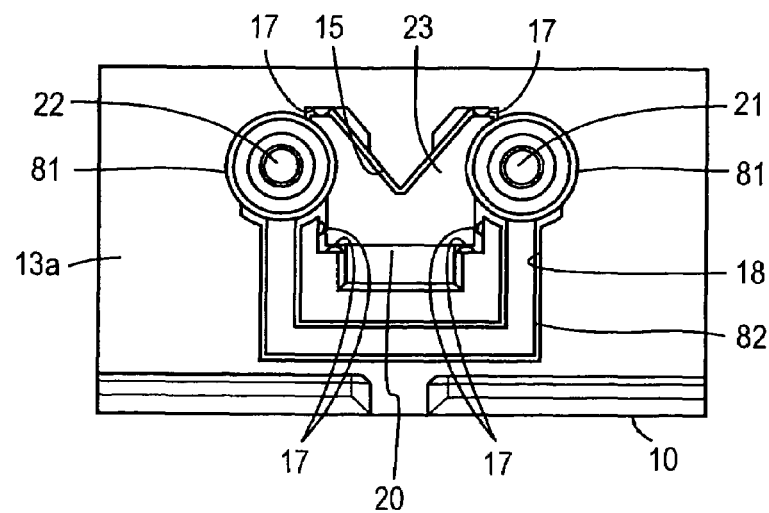
FIG. 12 is a rear view of the receptacle body in a state in which the light guide unit is mounted in the receptacle body and the attachments are attached to the receptacle body.

As shown in FIG. 11, the light guides 21 and 22 are inserted into a pair of through holes 14 from the rear face 13*a* of the receptacle body 10. At this point, the connecting portion 23 is press-fit into the recessed portion 15 formed on the rear face 13*a* and the connecting portion 23 is positioned and fixed by protrusions 17 as shown in FIG. 12 (in a similar manner to Patent document 1).

The light guides 21 and 22 have one ends opposed to the light-emitting device 30 and the light-receiving device 40 and the one ends are protruded from the rear face 13*a* of the receptacle body 10 as shown in FIG. 11. The attachments 81 are respectively attached to the one ends of the light guides 21 and 22. The attachments 81 are respectively fit into the light guides 21 and 22, and the light guides 21 and 22 are held by small-diameter holding portions 81*b* (FIG. 9C) of the attachments 81. The attachments 81 surround the one ends of the light guides 21 and 22 so as to hold the entire circumferences of the light guides 21 and 22. The coupling portion 82 connecting the pair of attachments 81 is stored, as shown in FIG. 12, in a recessed portion 18 formed on the rear face 13*a*.

The device holder 50 that stores and hold the light-emitting device 30 and the light-receiving device 40 is stored and held in the shield cover 60, and the shield cover 60 is attached to the receptacle body 10 from the rear face 13*a*. The shield cover 60 comprises, as shown in FIG. 7, a pair of locking portions 61. The locking portions 61 are locked on both sides of the receptacle body 10, so that the shield cover 60 is attached to the receptacle body 10.

The paired attachments 81 are respectively engaged with the guide holes 31 and 41 (FIG. 11) of the light-emitting device 30 and the light-receiving device 40, so that the end faces of the light guides 21 and 22 are opposed to the light-emitting device 30 and the light-receiving device 40, respectively.

As described above, in this example, the attachments 81 respectively attached to the light guides 21 and 22 are inserted and positioned in the guide holes 31 and 41, and the optical axes of the light guides 21 and 22 and the optical axes of the light-emitting device 30 and the light-receiving device 40 are aligned with each other. Moreover, the light-emitting device 30 and the light-receiving device 40 are slidably held by the device holder 50 such that the guide holes 31 and 41 are engaged with the attachments 81, that is, the light-emitting device 30 and the light-receiving device 40 are held with a certain clearance by the device holder 50 without precise positioning and fixation.

According to the connector configured thus, for example, in the event of molding strain on the receptacle body 10 or the light guide unit 20, the attachments 81 that hold the entire circumferences of the light guides 21 and 22 are respectively guided into engagement with the guide holes 31 and 41 of the light-emitting device 30 and the light-receiving device 40. Thus the optical axes of the light guides 21 and 22 and the optical axes of the light-emitting device 30 and the light-receiving device 40 are preferably aligned with each other (alignment) without being affected by such molding strain. Since the guide holes 31 and 41 are tapered as described above, the attachments 81 can be guided in a preferable manner.

Figure 5A:
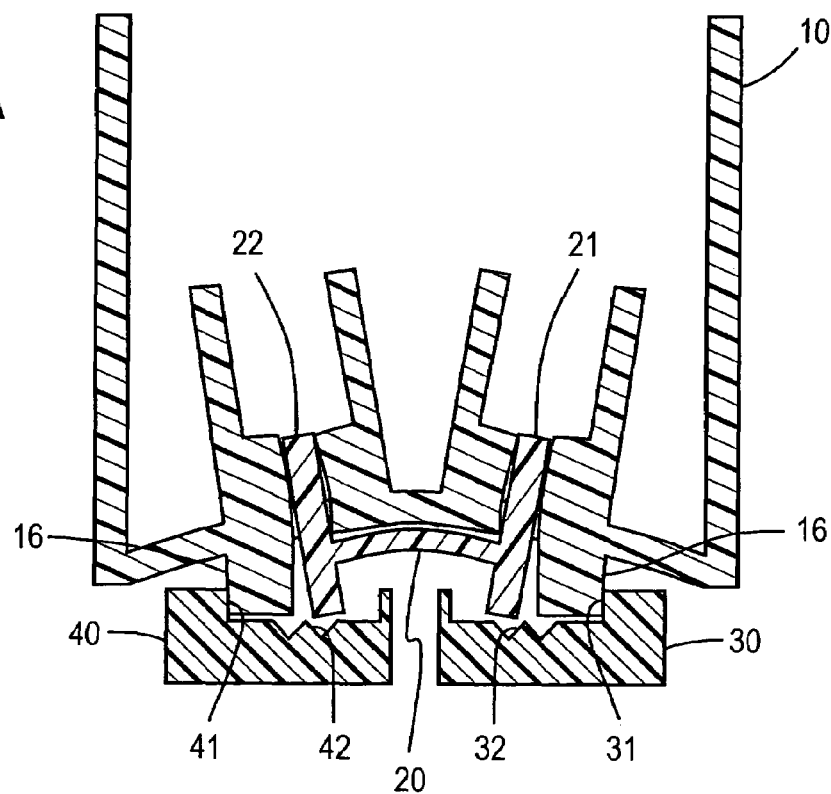
FIG. 5A is a sectional view for explaining a state in which molding strain occurs on the receptacle body and causes misalignment.
Figure 5B:
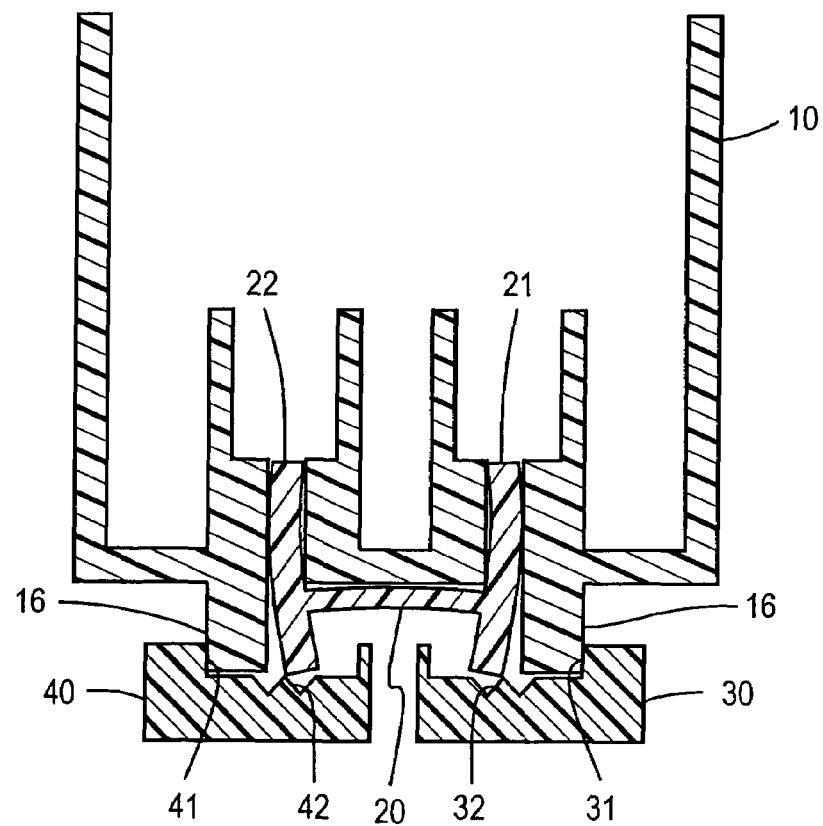
FIG. 5B is a sectional view for explaining a state in which molding strain occurs on the light guide unit and causes misalignment.
Figure 13A:
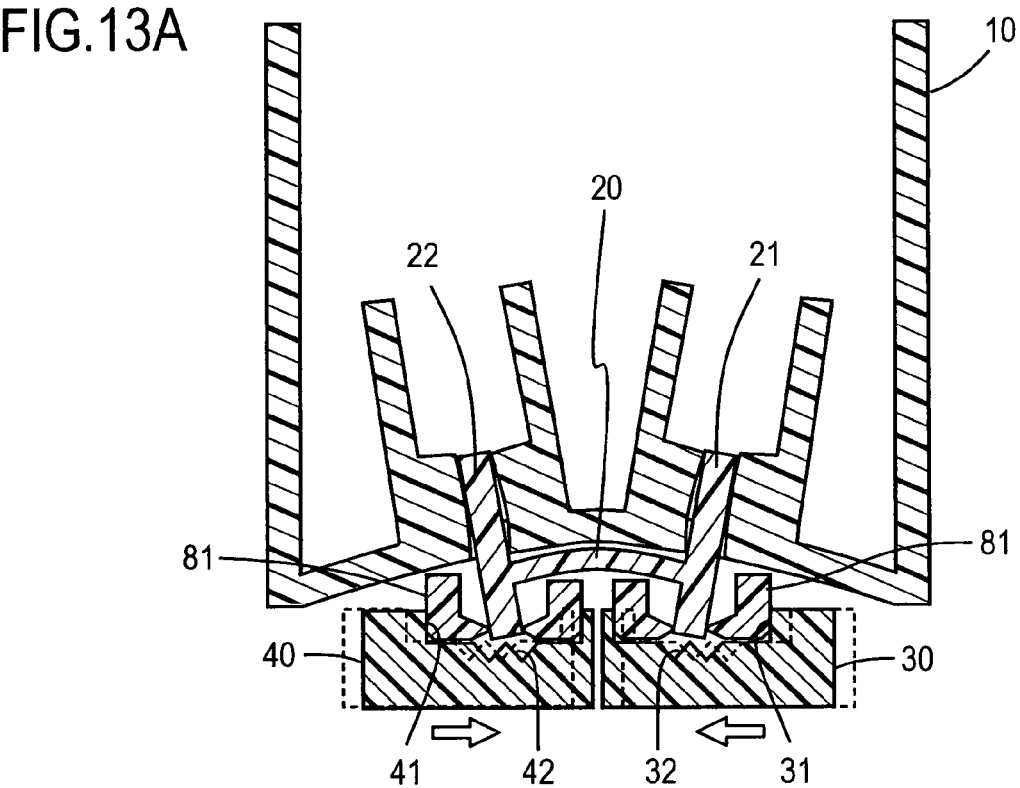
FIG. 13A is a sectional view for explaining a state in which the attachments are inserted and positioned in the guide holes of the light-emitting device and the light-receiving device to perform alignment when molding strain occurs on the receptacle body.
Figure 13B:
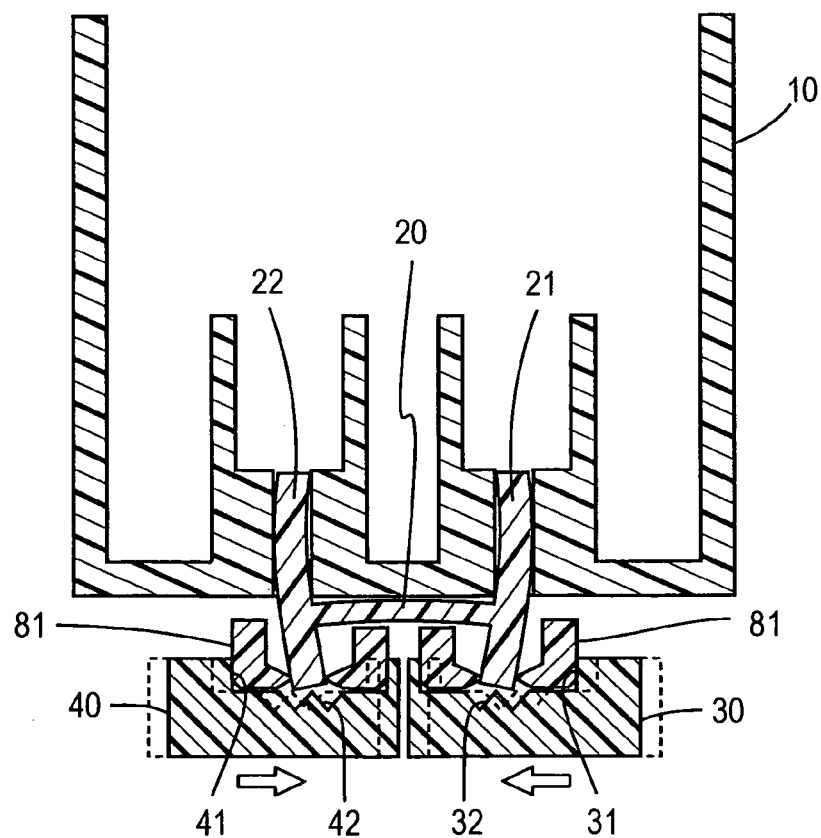
FIG. 13B is a sectional view for explaining a state in which the attachments are inserted and positioned in the guide holes of the light-emitting device and the light-receiving device to perform alignment when molding strain occurs on the light guide unit.

FIGS. 13A and 13B show an example in which molding strain occurs on the receptacle body 10 and an example in which molding strain occurs on the light guide unit 20 as in the conventional example of FIGS. 5A and 5B. Even in the event of such molding strain, the light-emitting device 30 and the light-receiving device 40 slide as indicated by arrows of FIGS. 5A and 5B and the guide holes 31 and 41 are respectively engaged with the attachments 81, so that the centers of the light guides 21 and 22 are aligned with the centers of the lenses 32 and 42. In other words, misalignment does not occur.

The movements of the attachments 81 are not limited by components other than the light-emitting device 30 and the light-receiving device 40. Since the coupling portion 82 has flexibility, the movements of the two attachments 81 are not limited by the coupling portion 82. Thus the attachments 81 can be preferably engaged with the guide holes 31 and 41.

In the foregoing example, although the two attachments 81 are connected via the coupling portion 82 and combined into a single unit, the attachments 81 may be, for example, separately (independently) provided without being combined. However, by combining the attachments 81 into a single unit as in the above example, the number of components can be reduced. The attachments 81 are made of a resin and may be made of, for example, a metal.

The attachments 81 have outside shapes which cover a shape difference between the light guides 21 and 22 and the guide holes 31 and 41 of the light-emitting device 30 and the light-receiving device 40. The attachments 81 are shaped like cylinders in this example. For example, when the guide holes 31 and 41 are not circular, the attachments 81 have outside shapes corresponding to the shapes of the guide holes 31 and 41.

The above explanation has described an example in which the attachments 81 are respectively attached to the light guides 21 and 22, the light guides 21 and 22 and the attachments 81 are fixed while the light-emitting device 30 and the light-receiving device 40 are allowed to slide, and the attachments 81 are engaged with the guide holes 31 and 41 and aligned therein by sliding the light-emitting device 30 and the light-receiving device 40. However, conversely the light-emitting device 30 and the light-receiving device 40 may be fixed and the attachments 81 for holding the light guides 21 and 22 may be made movable and guided into the guide holes 31 and 41.

Figure 14:
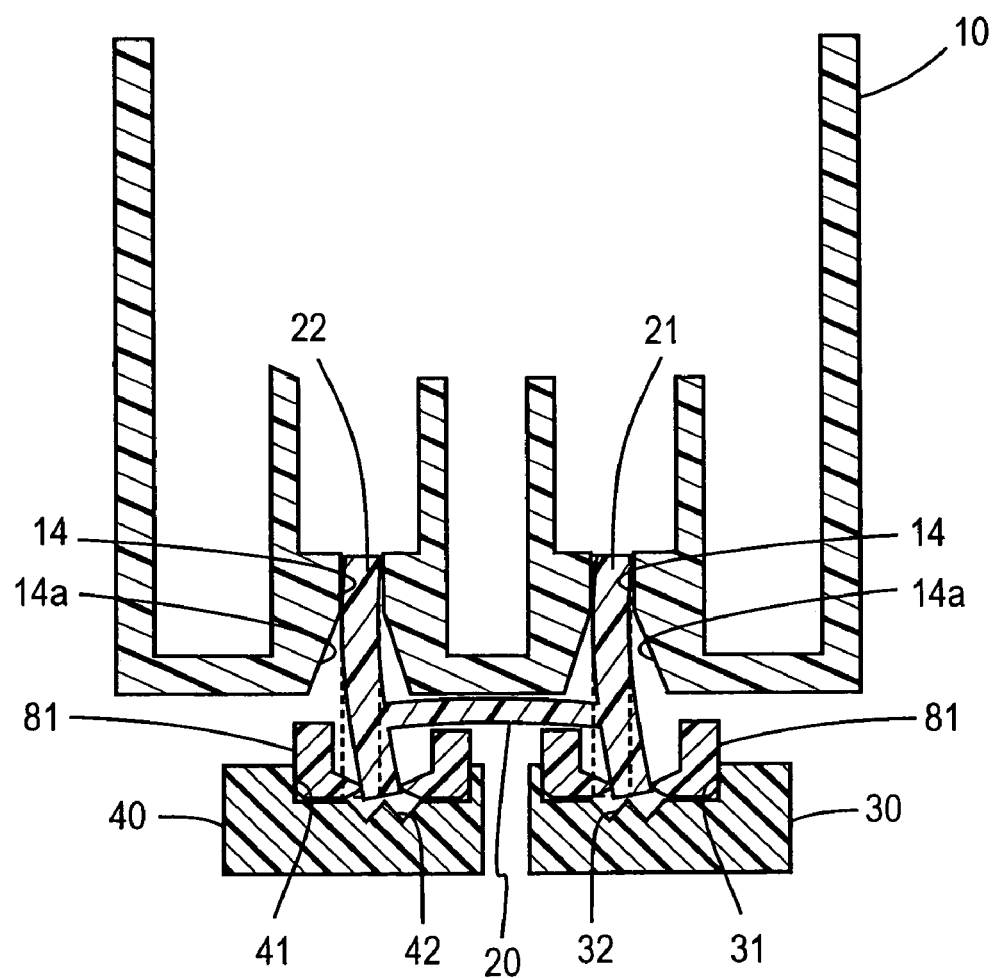
FIG. 14 is a sectional view for explaining another examples of the connector for two-way optical communications of the present invention.

FIG. 14 shows this configuration. In this example, the pair of through holes 14 of the receptacle body 10 have tapered portions on the side of the rear face 13*a*. The light guides 21 and 22 are inserted to the through holes 14.

In other words, the through holes 14 of this example have tapered portions 14a that increase in diameter toward the rear face 13a.

The light guides 21 and 22 have one ends opposed to the light-emitting device 30 and the light-receiving device 40, and the other ends on the opposite side are fit and fixed in the through holes 14. The one ends are bendable as shown in FIG. 14, that is, the one ends are movable. Also in this configuration, the attachments 81 are guided and engaged in the guide holes 31 and 41 of the light-emitting device 30 and the light-receiving device 40, and the optical axes of the light guides 21 and 22 and the optical axes of the light-emitting device 30 and the light-receiving device 40 can be preferably aligned with each other (alignment).

What is claimed is:

1. A connector for two-way optical communications, the connector being connected to an optical plug holding a transmitting optical fiber and a receiving optical fiber, the connector comprising:
    a receptacle body including a pair of receiving tubes to which the transmitting optical fiber and the receiving optical fiber are respectively inserted, the receiving tubes being firmed in a recessed portion provided on a front face of the receptacle body, the receptacle body including a pair of through holes that are respectively connected with the receiving tubes and opened on a rear face of die receptacle body,
    a device holder for holding a light-emitting device and a light-receiving device, the device holder being attached to the rear face, and
    a light guide unit including a pair of light guides shaped like cylinders and a connecting portion integrally interposed between the light guides, the light guides being respectively inserted in the pair of through holes, the light guides having one ends protruding from the rear face, the one ends being respectively opposed to the light-emitting device and the light-receiving device, the light guide unit optically connecting the transmitting optical fiber and the receiving optical fiber respectively to the light-emitting device and the light-receiving device,
    the connector further comprising a pair of attachments having through holes with hold portions, wherein:
        the one ends of the pair of light guides protruding from the rear face are inserted in the through holes of the attachments from one ends thereof and held by the hold portions,
        other ends of the attachments are inserted in guide holes respectively formed on the light-emitting device and the light-receiving device and positioned to fix positions in the guide holes, so that the attachments are secured only to the light-emitting device and the light-receiving device at the other ends thereof while the one ends thereof surround the one ends of the pair of light guides and optical axes of the pair of light guides and optical axes of the light-emitting device and the light-receiving device are aligned with each other.

2. The connector for two-way optical communications according to claim 1, wherein the light-emitting device and the light-receiving device are slidably held by the device holder such that the guide holes arc respectively engaged with the attachments.

3. The connector for two-way optical communications according to claim 1, wherein the through holes are increased in diameter on a side of the rear face and the one ends of the light guides are made bendable such that the attachments are engaged with the guide holes.

4. The connector for two-way optical communications according to claim 1, wherein the two attachments are integrally formed via a flexible coupling portion.

5. The connector for two-way optical communications according to claim 2, wherein the two attachments are integrally formed via a flexible coupling portion.

6. The connector for two-way optical communications according to claim 3, wherein the two attachments are integrally formed via a flexible coupling portion.

* * * * *